United States Patent
Konnai

(10) Patent No.: US 12,458,951 B2
(45) Date of Patent: Nov. 4, 2025

(54) HALLOYSITE POWDER

(71) Applicant: JFE MINERAL COMPANY, LTD., Tokyo (JP)

(72) Inventor: Hidefumi Konnai, Tokyo (JP)

(73) Assignee: JFE MINERAL COMPANY, LTD., Tokyo (JP)

( * ) Notice: Subject to any disclaimer, the term of this patent is extended or adjusted under 35 U.S.C. 154(b) by 319 days.

(21) Appl. No.: 17/801,903

(22) PCT Filed: Feb. 26, 2021

(86) PCT No.: PCT/JP2021/007474
§ 371 (c)(1),
(2) Date: Aug. 24, 2022

(87) PCT Pub. No.: WO2021/172547
PCT Pub. Date: Sep. 2, 2021

(65) Prior Publication Data
US 2023/0093119 A1 Mar. 23, 2023

(30) Foreign Application Priority Data
Feb. 28, 2020 (JP) ................................. 2020-033245

(51) Int. Cl.
*B01J 21/06* (2006.01)
*B01J 21/16* (2006.01)
(Continued)

(52) U.S. Cl.
CPC ............ *B01J 21/063* (2013.01); *B01J 21/16* (2013.01); *B01J 35/39* (2024.01); *B01J 35/45* (2024.01); *B01J 35/55* (2024.01); *B01J 2235/00* (2024.01); *B01J 2235/15* (2024.01); *B01J 2235/30* (2024.01)

(58) Field of Classification Search
CPC . B01J 21/063; B01J 21/16; B01J 35/39; B01J 35/50; B01J 35/40; B01J 35/613;
(Continued)

(56) References Cited

U.S. PATENT DOCUMENTS 6,090,736 A 7/2000 Taoda et al.
2020/0062603 A1 2/2020 Konnal et al.

FOREIGN PATENT DOCUMENTS

| CN | 107837802 A | 3/2018 |
| JP | 11267519 A | 10/1999 |
| WO | 2018079556 A1 | 5/2018 |

OTHER PUBLICATIONS

Li et al., "Low-temperature synthesis of heterogeneous crystalline TiO2-halloysite nanotubes and their visible light photocatalytic activity", Journal of Materials Chemistry A, (Jun. 2013), vol. 1(27):8045-8054.
(Continued)

*Primary Examiner* — Coris Fung
*Assistant Examiner* — Catriona M Corallo
(74) *Attorney, Agent, or Firm* — Buchanan Ingersoll & Rooney PC

(57) ABSTRACT

Halloysite powder is disclosed. The halloysite powder includes a granule in which halloysite including halloysite nanotubes and titanium oxide are aggregated. The granule includes a first pore derived from a tube hole of the halloysite nanotubes, and a second pore different from the first pore. The halloysite powder may have a differential pore distribution determined from a nitrogen adsorption isotherm by BJH method exhibiting two or more pore size peaks.

2 Claims, 3 Drawing Sheets

(51) Int. Cl.
*B01J 35/39* (2024.01)
*B01J 35/45* (2024.01)
*B01J 35/55* (2024.01) CPC ...................

(58) Field of Classification Search
CPC ........ B01J 35/633; B01J 35/647; B01J 35/69; B01J 35/695; B01J 37/0045; B01J 37/009; B01J 35/00; B01J 35/60; B01J 37/04; C01B 33/40
USPC .......................................................... 502/84
See application file for complete search history.

(56) References Cited

OTHER PUBLICATIONS

Papoulis et al., "Halloysite and sepiolite—TiO2 nanocomposites: Synthesis characterization and photocatalytic activity in three aquatic wastes", Materials Science in Semiconductor Processing, (May 19, 2018), vol. 85, pp. 1-8.
Papoulis et al., "Halloysite-TiO2 nanocomposites: Synthesis, characterization and photocatalytic activity", Applied Catalysis B: Environmental, (Mar. 1, 2013), vol. 132-133, pp. 416-422.
The Extended European Search Report for European Application No. 21 760 909.8, issued Apr. 25, 2024 (7 pages).
International Search Report and Written Opinion for International Application No. PCT/JP2021/007474, dated May 11, 2021, 5 pages.
Korean Office Action dated Jun. 27, 2024 for Korean Application No. 10-2022-7028621 with Concise Statement of Relevance of Office Action. (5 pages).

HALLOYSITE POWDER

CROSS REFERENCE TO RELATED APPLICATIONS

This is the U.S. National Phase application of PCT/JP2021/007474, filed Feb. 26, 2021, which claims priority to Japanese Patent Application No. 2020-033245, filed Feb. 28, 2020, the disclosures of these applications being incorporated herein by reference in their entireties for all purposes.

FIELD OF THE INVENTION

The present invention relates to halloysite powder.

BACKGROUND OF THE INVENTION

Conventionally, a photocatalyst containing titanium oxide has been used for purposes including: removal of odor; decomposition and removal of a harmful substance or pollution in the air; and sterilization (Patent Literature 1).

PATENT LITERATURE

Patent Literature 1: JP 11-267519 A

SUMMARY OF THE INVENTION

There is a demand for a development of a material having more excellent photocatalytic activity.

In the meantime, a halloysite nanotube that is tube-shaped halloysite has been used for various applications, taking advantage of the shape thereof. The present inventor has focused on a novel fine structure using powder of halloysite (halloysite powder), in particular, halloysite nanotubes.

Aspects of the present invention have been made in view of the above and aim at providing halloysite powder having excellent photocatalytic activity.

The present inventor found, though an earnest study, that employing the constitution described below enables the achievement of the above-mentioned object.

Specifically, aspects of the present invention include the following [1] to [3].

[1] Halloysite powder that is powder including a granule in which halloysite including halloysite nanotubes and titanium oxide are aggregated.

[2] The halloysite powder according to [1], wherein the granule includes a first pore derived from a tube hole of each of the halloysite nanotubes, and a second pore different from the first pore.

[3] The halloysite powder according to [1] or [2], wherein a differential pore distribution determined from a nitrogen adsorption isotherm by BJH method exhibits two or more pore size peaks.

Aspects of the present invention can provide halloysite powder having excellent photocatalytic activity.

DETAILED DESCRIPTION OF EMBODIMENTS OF THE INVENTION

Figure 1:
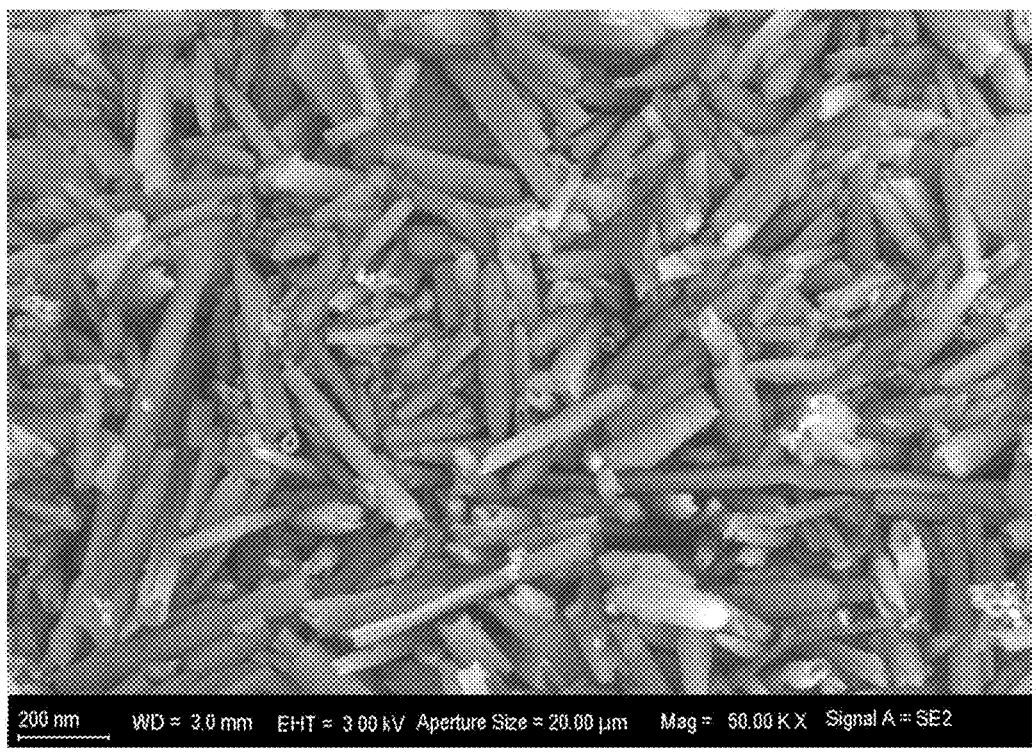
FIG. 1 is an SEM image showing a granule in halloysite powder 1.

In the present specification, the numerical ranges indicated using "(from) . . . to . . . " include the former number as the lower limit value and the latter number as the upper limit value.

Halloysite Powder

The halloysite powder according to aspects of the invention is powder including a granule in which halloysite including a halloysite nanotube and titanium oxide are aggregated. The granule preferably includes a first pore derived from a tube hole of the halloysite nanotube, and a second pore different from the first pore.

In the present specification, an aggregate of a plurality of "granules" is referred to as "powder."

The halloysite powder according to aspects of the invention has not only excellent adsorption capacity but also excellent photocatalytic activity. The presumable reason therefor is described below.

First, the granule constituting the halloysite powder according to aspects of the invention exhibits good adsorption capacity. The granule has the first pore and the second pore and thus has more excellent adsorption capacity. In addition, titanium oxide included in the granule exhibits photocatalytic capacity. It is presumed that owing to this constitution, good photocatalytic activity is exhibited.

Titanium Oxide

For titanium oxide used in accordance with aspects of the invention, ultraviolet-light-responsive titanium oxide, visible-light-responsive titanium oxide, or another titanium oxide exhibiting the desired capacity is appropriately selected.

Titanium oxide may be, for example, subjected to treatment (such as surface treatment or heat treatment) to improve the photocatalytic activity.

Titanium oxide may be a Ti-based compound and may contain another metal (platinum, for example) than Ti in a simple substance form or various compound forms.

Any commercially available product may be used as the titanium oxide, and specific and non-limiting examples thereof include AERO OXIDE P25 (available from Evonic Industries), AERO OXIDE P90 (available from Evonic Industries), ST-01 (available from ISHIHARA SANGYO KAISHA, LTD.), ST-21 (available from ISHIHARA SANGYO KAISHA, LTD.), and MPT-623 (available from ISHIHARA SANGYO KAISHA, LTD.).

Of the exemplified commercially available products, AERO OXIDE P25, AERO OXIDE P90, ST-01 and ST-21 are ultraviolet-light-responsive titanium oxide, and MPT-623 is visible-light-responsive titanium oxide.

MPT-623 is titanium oxide that is surface-treated using a platinum compound.

These kinds of titanium oxides may be used singly or in combination of two or more.

Titanium Oxide Content

The titanium oxide ($TiO_2$) content in the halloysite powder according to aspects of the invention is preferably not less than 2.00 mass %, more preferably not less than 5.00 mass %, and further preferably not less than 8.00 mass % because the photocatalytic activity is more excellent.

The upper limit thereof is not particularly limited and is, for example, not more than 25.00 mass %, preferably not more than 25.00 mass %, and more preferably not more than 15.00 mass % in view of maintaining the granular structure.

The $TiO_2$ content is determined through X-ray fluorescence (XRF) analysis. The $TiO_2$ content is a 100%-normalized value excluding an ignition loss.

The specific conditions in the XRF analysis are as follows.

Instrument used: ZSX Primus IV (available from Rigaku Corporation)
Pretreatment method: Glass bead method using $Li_2B_4O_7$ flux
Quantitative method: Calibration curve method using standard sample (fireclay brick standard sample series) for X-ray fluorescence spectrometry of the Technical Association Of Refractories, Japan Summary of Halloysite Halloysite is a clay mineral represented by $Al_2Si_2O_5(OH)_4 \cdot 2H_2O$, or $Al_2Si_2O_5(OH)_4$.

Halloysite assumes various shapes such as a tubular shape (hollow tubular shape), a spherical shape, an angular lump shape, a plate-like shape, and a sheet-like shape.

The inner diameter of a halloysite nanotube (the diameter of a tube hole), which halloysite nanotube is a tube-shaped (hollow tube-shaped) halloysite, is approximately from 10 to 20 nm, for example. The outer surface of the halloysite nanotube is mainly composed of silicate ($SiO_2$), and the inner surface of the halloysite nanotube is mainly composed of alumina ($Al_2O_3$).

In the specification, "halloysite" includes "metahalloysite."

"Metahalloysite" is the dehydrated halloysite, i.e., halloysite represented by $Al_2Si_2O_5(OH)_4$ from which OH was removed to assume a low-crystalline form, and is a term that has been conventionally, generally or idiomatically used to refer to a variant of halloysite.

In the specification, "metahalloysite" is defined as "a product obtained by firing halloysite at a specific firing temperature." The "specific firing temperature" is, for example, not lower than 500° C., and preferably not lower than 600° C.

The upper limit of the "specific firing temperature" is not particularly limited and is, for example, not higher than 1,000° C. Within the foregoing temperature range, the shape of halloysite nanotube (tubular shape) does not change.

XRD

Figure 3:
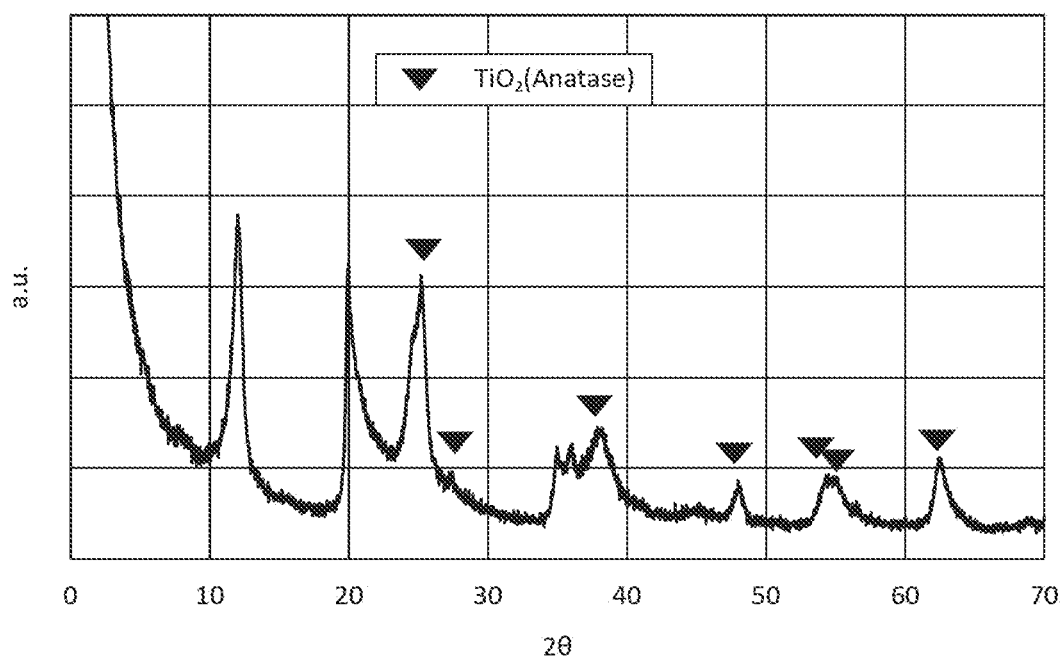
FIG. 3 is the XRD pattern of the halloysite powder 1.

The halloysite powder according to aspects of the invention can be confirmed to have the halloysite crystal structure from, for example, the X-ray diffraction (XRD) measurement result (see FIG. 3).

FIG. 3 is the XRD pattern of the halloysite powder according to aspects of the invention (halloysite powder 1 to be described later).

As shown in FIG. 3, peaks of halloysite represented by $Al_2Si_2O_5(OH)_4$ are seen around $2\theta=10°$, 20°, and 35° in the XRD pattern of the halloysite powder 1.

In addition, as shown in FIG. 3, peaks of anatase-type titanium oxide ($TiO_2$) are seen in the XRD pattern of the halloysite powder 1.

The specific conditions in the XRD measurement are as follows.

Instrument used: X-ray diffractometer, D8ADVANCE (available from BRUKER CORPORATION)
X-ray tube: CuKα
Optical system: Bragg-Brentano geometry
Tube voltage: 35 kV
Tube current: 40 mA
Detector: One-dimensional semiconductor detector
Scan range: 2 to 70 deg
Scan step: 0.021 deg
Scan speed: 4 deg/min

SEM

In a scanning electron microscope (SEM) image, for example, it can be confirmed that the granule included in the halloysite powder according to aspects of the invention is a granule in which halloysite including halloysite nanotubes is aggregated, and that the granule has a pore (first pore) derived from the tube hole of the halloysite nanotubes (see FIG. 1).

FIG. 1 is the SEM image showing a granule in the halloysite powder according to aspects of the invention (halloysite powder 1 described later).

In FIG. 1, a spherical granule can be observed, the granule being formed of halloysite including halloysite nanotubes and titanium oxide that are aggregated.

More specifically, titanium oxide takes a particulate form, and each particle or an aggregate of particles of titanium oxide is attached to a granule surface or enters a gap between halloysite nanotubes.

Further, in FIG. 1, the tube holes of the halloysite nanotubes (first pores derived from the tube holes) can also be observed on the surface of the granule.

The reason why the granular structure including the first pore as above is obtained is probably because, for example, spray-drying a slurry including halloysite nanotubes allows the halloysite nanotubes to aggregate with their tube shape being maintained.

In addition, in FIG. 1, pores (second pores) with a larger size than that of the tube hole of the halloysite nanotube (normally, the inner diameter is approximately from 10 to 20 nm) can be observed on the granule surface (between halloysite nanotubes, in particular).

The reason why the second pore as above is obtained is probably because the dispersion medium of a slurry is evaporated and removed from the granule (inside of the granule) when the slurry is formed into granules by spray-drying or the like.

Pore Distribution Measurement

Figure 2:
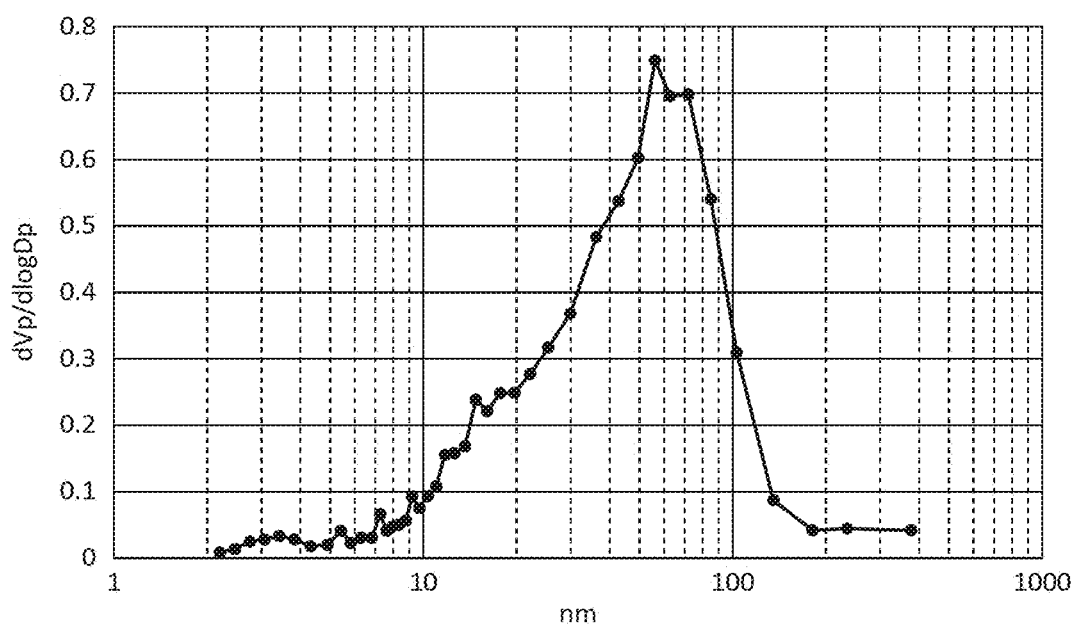
FIG. 2 is a graph showing the differential pore distribution of the halloysite powder 1.

It can be confirmed that the granule included in the halloysite powder according to aspects of the invention has the specific structure as described above also in view of the pore distribution measurement result of the halloysite powder according to aspects of the invention (see FIG. 2).

It is more preferable that, of the halloysite powder according to aspects of the invention, the differential pore distribution (log differential pore volume distribution) determined from a nitrogen adsorption isotherm by the BJH method shows two or more pore size peaks. The details thereof will be described below.

FIG. 2 is a graph showing the differential pore distribution (log differential pore volume distribution) determined from a nitrogen adsorption isotherm by the BJH method for the halloysite powder according to aspects of the invention (halloysite powder 1 described later). The horizontal axis represents pore size (nm), and the vertical axis represents differential pore volume ($dVp/dlogDp$) ($cm^3/g$) (the same applies hereinafter).

The graph of FIG. 2 clearly shows two or more pore size peaks.

More specifically, two or more pore size peaks are clearly shown in the range of 10 nm or more (in particular, 10 to 100 nm, for example).

Further specifically, one pore size peak appears in the range of 10 nm or more and 20 nm or less, and another pore size peak appears also in the range of more than 20 nm (in particular, more than 20 nm and 100 nm or less, for example).

Supposedly, the peak with the smaller pore size (pore size peak of 10 nm or more and 20 nm or less) represents the first pore derived from the tube hole of the halloysite nanotube (inner diameter: approximately 10 to 20 nm), and the peak with the larger pore size (pore size peak of more than 20 nm) represents the second pore different from the tube holes.

When including the second pore, the halloysite powder according to aspects of the invention has a large total pore area and a large total pore volume described later.

Specifically, the total pore area of the halloysite powder according to aspects of the invention is preferably not less than 59.0 $m^2/g$, more preferably not less than 65.0 $m^2/g$, and further preferably not less than 75.0 $m^2/g$. The upper limit thereof is not particularly limited and is, for example, not more than 200.0 $m^2/g$, and preferably not more than 150.0 $m^2/g$.

The total pore volume of the halloysite powder according to aspects of the invention is preferably not less than 0.20 $cm^3/g$, and more preferably not less than 0.23 $cm^3/g$. The upper limit thereof is not particularly limited and is, for example, not more than 0.80 $cm^3/g$, and preferably not more than 0.60 $cm^3/g$.

In addition, the average pore size of the halloysite powder according to aspects of the invention is, for example, not less than 5.0 nm, and preferably not less than 11.0 nm. The upper limit thereof is not particularly limited and is, for example, not more than 45.0 nm, and preferably not more than 35.0 nm.

The BET specific surface area (specific surface area determined by the BET method) of the halloysite powder according to aspects of the invention is, for example, 30 to 200 $m^2/g$, and preferably 50 to 150 $m^2/g$.

Next, the method of measuring the pore distribution and the like will be described.

Pretreatment (vacuum-deaeration at 120° C. for 8 hours) is first performed, and then a nitrogen adsorption-desorption isotherm is measured by a constant volume method under the following conditions. The equilibrium waiting time refers to the waiting time after reaching an adsorption equilibrium state.

The BET specific surface area ($m^2/g$) is determined by applying the BET method using the nitrogen adsorption isotherm.

The average pore size (nm) is calculated from the values of the BET specific surface area and the total pore volume ($cm^3/g$). The total pore volume used for calculation of the average pore size (for convenience, also referred to as "total pore volume for calculation") is determined from the adsorption amount at a relative pressure of 0.99 on the adsorption isotherm, assuming that capillary condensation occurs in pores that are present at relative pressures up to 0.99 on the adsorption isotherm.

Furthermore, the log differential pore volume distribution, the total pore volume ($cm^3/g$), and the total pore area ($m^2/g$) are determined by applying the BJH method using the FHH reference curve from the nitrogen adsorption isotherm. The standard conditions of analysis software are used for the plot intervals of the pores of approximately from 2.6 nm to 200 nm in size. Note that the total pore volume and the total pore area determined by the BJH method are respectively referred to as "BJH total pore volume" and "BJH total pore area."

In accordance with aspects of the present invention, in the case of simply referring to "total pore volume" and "total pore area", the "total pore volume" and the "total pore area" respectively mean the "BJH total pore volume" and the "BJH total pore area" unless noted otherwise.

Adsorption temperature: 77 K
    Nitrogen cross-sectional area: 0.162 $nm^2$
    Saturated vapor pressure: Measured
    Equilibrium waiting time: 500 sec
    Pretreatment instrument: BELPREP-vacII (available from MicrotracBEL Corp.)
    Measurement instrument: BELSORP-mini (available from MicrotracBEL Corp.)
    Analysis software: BELMaster Version 6.4.0.0 (available from MicrotracBEL Corp.)

Average Particle Size

The average particle size of the halloysite power according to aspects of the invention is not particularly limited and appropriately selected depending on the application. The average particle size is, for example, 0.5 to 200 μm. In a case where the halloysite powder according to aspects of the invention is prepared by spray-drying, the average particle size is preferably 1 to 100 μm.

The granules having such particle sizes may be increased in size through the granulation described above. Note that, in this case, the average particle size is preferably not greater than 5 mm.

Taking into account the size with which the granules can enter organs of respiration as a concern of harm, the granules preferably have the minimum size of not less than 1 μm.

The average particle size is dry-measured by using a laser diffraction-scattering type particle size distribution measuring apparatus (Microtrac MT3300EXII) available from MicrotracBEL Corp.

Method of Producing Halloysite Powder

Next, a method of producing the halloysite powder according to aspects of the invention (hereinafter, also referred to as "production method according to aspects of the invention" for convenience) is described.

The production method according to aspects of the invention preferably includes at least a step of preparing a slurry containing halloysite including halloysite nanotubes and titanium oxide (slurry preparation step), and a step of preparing powder from the slurry (powder preparation step). According to the method, it is possible to obtain granules in which halloysite including halloysite nanotubes and titanium oxide are aggregated.

Below, a preferred embodiment of the production method according to aspects of the invention is described.

Slurry Preparation Step

The slurry preparation step is not particularly limited as long as a slurry in which halloysite including halloysite nanotubes and titanium oxide are dispersed in a dispersion medium such as water can be prepared.

A preferred embodiment of the slurry preparation step will be described below. In the embodiment described below, a dispersed phase which is recovered after centrifugation and to which titanium oxide is added corresponds to a slurry prepared in the slurry preparation step.

Raw Material Halloysite

As halloysite that is a material used in the production method according to aspects of the invention (hereinafter, also referred to as "raw material halloysite"), commercially available halloysite (halloysite nanotubes) can be used, and specifically, suitable examples thereof include halloysite (trade name: DRAGONITE-HP) available from APPLIED MINERALS INC.

Preparation of Slurry

Next, a slurry in which the raw material halloysite is dispersed in water is prepared. The method of dispersing the raw material halloysite in water is not particularly limited, and, for example, known apparatuses such as a high-speed mixer, a disperser, a bead mill, and a homomixer can be used.

The solid content concentration of the slurry is not particularly limited and is, for example, 30 to 50 mass %.

For its large influence on the precision of centrifugation described later, a dispersant is preferably added to the slurry. Addition of a dispersant enables to obtain a slurry having a higher concentration and thus provides an effect of enhancing productivity in drying using, for instance, a spray-dryer described later.

Regarding the dispersant, it is preferable that a stable slurry can be obtained with use of a small amount of the dispersant, and examples thereof include a polymer anionic surfactant (anionic polymeric surfactant).

Specific examples of the anionic polymeric surfactant include POIZ 520, POIZ 521, and POIZ 530 (all available from Kao Corporation), which are special polycarboxylate type surfactants.

Use can be also made of POIZ 532A, KAOCER 2000, KAOCER 2020, KAOCER 2110 (available from Kao Corporation), or the like, which includes no ions of metal such as sodium or potassium, depending on the application.

Not only polycarboxylate type surfactants but surfactants of other types such as acrylate type and sulfonate type can be used.

The dispersant content is not particularly limited and is preferably, for example, 0.5 to 3.0 mass % relative to the total solid content in the slurry.

When the dispersant content is too small, dispersion of particles of halloysite and impurities in the slurry may be insufficient. On the other hand, when the dispersant content is too large, the dispersant may cause aggregation, or costs may increase. In such a case, the dispersant may further cause problems in subsequent processes (for example, decrease in recovery rate of a dispersed phase in centrifugation, insufficient drying in spray-drying, or insufficient compaction or burning in firing).

Removal of Coarse Particles

In order to improve the precision of the centrifugation described later, coarse particles may be removed from the slurry. For removal of coarse particles, for example, a sieve having an aperture of 25 to 100 μm or a wet type cyclone is used. Other than the above, coarse particles may be removed by subjecting the slurry to natural sedimentation separation.

Centrifugation

The obtained slurry is subjected to centrifugation, thereby being separated into a sedimented phase of a lower layer and a dispersed phase of an upper layer. The sedimented phase includes a large amount of fine sand or other impurities, and the dispersed phase includes a large amount of halloysite nanotubes. The solid content concentration of the dispersed phase (slurry) is, for example, 10 to 30 mass %.

The centrifugal force and treatment time for centrifugation are, for example, 2000 to 3000 G and 3 to 30 minutes, respectively, but are not limited to these numerical ranges. They are appropriately determined taking into account a dispersion state, application, costs, and the like.

A large-size centrifugal separator can be used for mass production.

The dispersed phase is recovered, whereby halloysite nanotubes can be purified and separated from the raw material halloysite including fine sand or other impurities.

Addition of Titanium Oxide

Titanium oxide is added to the dispersed phase (slurry) thus recovered.

Titanium oxide to be added is preferably in the form of fine particles because the dispersibility of titanium oxide improves, and the photocatalytic activity is more excellent. Specifically, the primary particle size of titanium oxide to be added is preferably not more than 100 nm, and more preferably not more than 80 nm. The primary particle size refers to a primary particle size determined by the X-ray method.

Because of the similar reason, the BET specific surface area of titanium oxide to be added is preferably not less than 20 $m^2/g$, and more preferably not less than 30 $m^2/g$.

An amount of titanium oxide to be added is, for example, an amount with which titanium oxide would account for 5 to 15 mass % of the slurry including the added titanium oxide, but the amount is not limited thereto.

Titanium oxide is added and thereafter dispersed in the slurry. The method therefor is not particularly limited, and, for example, conventionally known apparatuses such as a high-speed mixer, a disperser, a bead mill, and a homomixer can be used.

The slurry obtained in the slurry preparation step can be additionally subjected to purification, classification, magnetic separation or concentration as necessary.

Powder Preparation Step

The powder preparation step is a step of preparing powder from the slurry prepared in the slurry preparation step.

The powder obtained in the powder preparation step may be granulated by further performing treatments such as tumbling, stirring, and extruding. Thus, granules constituting the powder can be increased in size.

Spray-Drying

Examples of the powder preparation step include a step of spray-drying the slurry prepared in the slurry preparation step to obtain powder.

The prepared slurry is spray-dried using a spray-dryer that is an apparatus instantly producing powder by spraying slurry in the form of minute droplets (i.e., forming fine particles) and drying the droplets through application of hot air. The spray-dryer is a conventionally known apparatus, and examples thereof include spray-dryers available from Ohkawara Kakohki Co., LTD., Fujisaki Electric Co., LTD., and Japan Chemical Engineering & Machinery Co., Ltd.

In the spray-dryer, the size of powder particles (granules) obtained by drying can be controlled by changing the size of droplets obtained by spraying a liquid raw material (i.e., forming fine particles).

The method of forming the liquid raw material into fine particles by using a spray-dryer is not particularly limited. For example, a known method such as a two-fluid nozzle method, a pressure nozzle (compression nozzle) method, a four-fluid nozzle method (twin-jet nozzle method), or a rotating disc method can be appropriately selected according to the size of droplets desired. The size of powder particles (granules) obtained by drying depends on, for example, the concentration of the slurry and/or the amount of the slurry to be treated. Thus, in addition to selecting an appropriate method for forming fine particles, the state of the slurry is appropriately selected to achieve a desired particle size.

For the method of bringing sprayed droplets into contact with hot air, a typically-employed concurrent flow method in which both of hot air and sprayed droplets are directed downward; a countercurrent flow method in which sprayed droplets are directed downward and the hot air is directed upward, that is, the flows of the hot air and sprayed droplets are countercurrents; a mixed flow method in which sprayed droplets are directed upward and hot air is directed downward; and the like are appropriately selected.

In spray-drying, heat is instantaneously applied, and therefore the powder itself does not reach a high temperature. In spray-drying, the powder is directly obtained by drying the slurry, and therefore treatments such as filtering, drying, and pulverizing are eliminated, being able to prevent contamination that may occur during a series of the operations.

Media Fluidized Drying

As long as the halloysite powder according to aspects of the invention can be obtained, the method of preparing powder from the slurry is not limited to the spray-drying described above, and for example, media fluidized drying (drying using a fluidized bed including balls) may be employed.

The powder preparation step may be a step of media-fluidized-drying the slurry prepared in the slurry preparation step to obtain powder.

In summary, the media fluidized drying involves, for example, continuously supplying a slurry to be dried into a layer of ceramic balls ($\varphi$1 to 3 mm) in a fluidized state, and thus adhering the slurry on the surfaces of the balls. Objects to be dried are instantly dried by heat conduction from the heated balls and convective heat transfer from fluidization hot air, and then peeled off from the surfaces of the balls by collision among the balls. The powder is thus obtained.

Firing Step

The method of producing the halloysite powder according to aspects of the invention may further include a step (firing step) of firing the powder obtained in the powder preparation step.

In a case where a dispersant such as a surfactant is used for preparation of the slurry described above, the dispersant may also remain in the powder obtained by spray-drying or the like. The firing step provides an effect that the dispersant can be removed by performing firing.

The firing temperature is preferably temperature at which the halloysite or metahalloysite crystal structure can be maintained at the time of the XRD measurement after firing. Specifically, the firing temperature is preferably not lower than 200° C., more preferably not lower than 300° C., and further preferably not lower than 400° C. Meanwhile, the firing temperature is preferably not higher than 1,000° C., more preferably not higher than 900° C., and further preferably not higher than 800° C.

The firing time is preferably not less than 0.5 hours, and more preferably not less than 0.75 hours. Meanwhile, the firing time is preferably not more than 10 hours, and more preferably not more than 5 hours.

When the production method according to aspects of the invention does not include the firing step, the powder obtained in the powder preparation step is the halloysite powder according to aspects of the invention.

In the meantime, when the production method according to aspects of the invention includes the firing step, the powder having been fired in the firing step is the halloysite powder according to aspects of the invention.

EXAMPLES

Aspects of the present invention are specifically described below with reference to Examples. However, the present should not be construed as being limited to the following examples.

Test 1

Example 1

Preparation of Halloysite Powder 1

Halloysite powder 1 (corresponding to the "halloysite powder according to aspects of the invention" described above) was produced as described below.

Raw Material Halloysite

As raw material halloysite, halloysite (trade name: DRAGONITE-HP) available from APPLIED MINERALS INC. was prepared.

Preparation of Slurry

The raw material halloysite, water, and an anionic polymeric surfactant (POIZ 520, available from Kao Corporation) were charged into a high-speed mixer (Ultra Homomixer UHM-20 (20 L), available from NISSEI Corporation.) and were subjected to treatment for 10 minutes at 10,000 rpm, whereby a slurry in which the raw material halloysite was dispersed in water (solid content concentration: 40 mass %) was obtained. The content of the anionic polymeric surfactant relative to the total solid content of the slurry was 1.5 mass %.

Centrifugation

Using a centrifugal separator (small-size desktop centrifugal machine H-19a, available from Kokusan Corp.), centrifugation was performed at a centrifugal force of 2470 G for 10 minutes to separate the slurry into a sedimented phase and a dispersed phase, and the dispersed phase was recovered.

Addition of Titanium Oxide

To 90 parts by mass of a solid content of the dispersed phase (slurry) thus recovered, 10 parts by mass of ultraviolet-light-responsive titanium oxide (AERO OXIDE P90, available from Evonic Industries) with the BET specific surface area of 90 m$^2$/g was added. In addition, water was added such that the total solid content was adjusted to be 15 mass %, and the resultant was subjected to treatment using a high-speed mixer (Ultra Homomixer UHM-20, available from NISSEI Corporation) at 7,000 rpm for 10 minutes, whereby titanium oxide was dispersed in the slurry.

Spray-Drying

The dispersed phase (slurry) to which titanium oxide was added was spray-dried using a spray-dryer, whereby powder (halloysite powder) was obtained.

Using the spray-dryer L-8i available from Ohkawara Kakohki Co., Ltd. as the spray-dryer, the slurry was dispensed to the spray-dryer with a pump at a constant volume and formed into fine particles (sprayed). As the method of bringing sprayed droplets into contact with hot air, the concurrent flow method in which both of hot air and sprayed droplets are directed downward was used. The spray-drying conditions are as follows:

Fine particle formation method: four-fluid nozzle method

Spray air pressure: 0.20 MPa

Moisture evaporation amount: 2.1 kg/h

Inlet Temperature: 190° C.

Outlet temperature: 80° C.

Evaluation of Halloysite Powder 1

The halloysite powder 1 was evaluated as follows.

TiO$_2$ Content

TiO$_2$ content in the halloysite powder 1 was measured. The result is shown below. The measurement conditions are as described above.

TiO$_2$ content: 11.7 mass %

XRD

The halloysite powder 1 was subjected to XRD measurement. The measurement conditions are as described above.

FIG. 3 is the XRD pattern of the halloysite powder 1. As shown in FIG. 3, peaks of halloysite are seen around 2θ=10°, 20°, and 35° in the XRD pattern of the halloysite powder 1. Moreover, peaks of anatase-type titanium oxide ($TiO_2$) are also seen.

SEM

An SEM image of the halloysite powder 1 was taken.

FIG. 1 is an SEM image showing a granule of the halloysite powder 1.

From the SEM image in FIG. 1, it was confirmed that the halloysite powder 1 included a granule in which halloysite including halloysite nanotubes was aggregated, and that pores (first pores) derived from tube holes of halloysite nanotubes were present on the granule surface. It was also confirmed that pores (second pores) with a larger size than that of the tube holes of halloysite nanotubes were present in a cross-section (not shown) of the granule.

It was also confirmed in the SEM image in FIG. 1 that each particle or an aggregate of particles of titanium oxide is attached to the granule surface or enters a gap between halloysite nanotubes constituting the granule.

Pore Distribution Measurement

The nitrogen adsorption-desorption isotherm of the halloysite powder 1 was measured. The measurement conditions are as described above.

FIG. 2 is a graph showing the differential pore distribution of the halloysite powder 1 determined from the nitrogen adsorption isotherm by the BJH method. The horizontal axis represents pore size [nm], and the vertical axis represents differential pore volume (dVp/dlogDp) [$cm^3$/g]. In the graph in FIG. 2, two or more pore size peaks were observed in the range of 10 nm or more (10 to 100 nm).

Along with the pore distribution measurement, the BJH total pore volume, the BET specific surface area, and the average pore size were determined for the halloysite powder 1. The results are shown below.

BJH total pore volume: 0.48 $cm^3$/g
BET specific surface area: 63.32 $m^2$/g
Average pore size: 30.3 nm Average Particle Size The average particle size of the halloysite powder 1 was measured. The result is shown below.

Average particle size: 6.2 μm

Methylene Blue Adsorption Test

In a 50 mL centrifuge tube, 0.20 g of the halloysite powder 1 was placed, and 20 mL of a methylene blue solution having a mass/volume percent concentration of 0.02% (mass of methylene blue in 100 mL: 0.02 g) was further added. The methylene blue solution was prepared by diluting a methylene blue solution for bacterial staining having a mass/volume percent concentration of 0.5% (mass of methylene blue in 100 mL: 0.5 g) available from Sigma-Aldrich Co., LLC with pure water.

The centrifuge tube containing the halloysite powder 1 and the methylene blue solution was placed on a tube rotator (MX-RL-Pro, available from AS ONE CORPORATION) and subjected to stirring at room temperature for 24 hours.

After stirring, the content in the centrifuge tube was separated into solid and liquid using a centrifugal separator (High speed, large capacity refrigerated centrifuge Model 7000, available from KUBOTA CORPORATION).

The solid-liquid separated content was visually observed and found to have blue color on the sedimented solid side, while being colorless and transparent on the liquid side. This is probably because methylene blue molecules were adsorbed onto the halloysite powder 1 present in the sedimented solid, which took on blue color. In other words, methylene blue adsorptivity of the halloysite powder 1 was confirmed.

Photocatalytic Test A (Ultraviolet Light)

Sediment onto which methylene blue was adsorbed was applied to filter paper and dried, whereby the solid was fixed on the filter paper. The solid fixed on the filter paper was irradiated with light having a wavelength of 365 nm for the test, and decomposition of methylene blue was observed.

More specifically, a UV lamp (handy UV lamp LUV-6, 365 nm, 9 w, available from AS ONE CORPORATION) as a light source was attached to a dark box (available from AS ONE CORPORATION) suitable for the lamp. The filter paper with the solid fixed thereon was placed to be located 15 cm away from the light source in the dark box.

As time passed, blue color of methylene blue disappeared, resulting in almost complete disappearance of the color in 185 hours.

Therefore, good photocatalytic activity of the halloysite powder 1 was confirmed.

Comparative Example 1

Except that titanium oxide was not added to the dispersed phase (slurry), powder was obtained in the same manner as in Example 1 (halloysite powder 1). This powder was treated as halloysite powder X1.

The BJH total pore volume, the BET specific surface area, the average pore size, and the average particle size were determined for the halloysite powder X1 in the same manner as in Example 1. The results are shown below.

BJH total pore volume: 0.39 $cm^3$/g
BET specific surface area: 62.13 $m^2$/g
Average pore size: 29.9 nm
Average particle size: 5.8 μm The halloysite powder X1 was subjected to methylene blue adsorption test in the same manner as in Example 1. The result thereof was similar to that of Example 1, and the sedimented solid took on blue color, while the liquid was colorless and transparent. In other words, methylene blue adsorptivity of the halloysite powder X1 was confirmed.

Next, the photocatalytic test A was conducted in the same manner as in Example 1. Differently from Example 1, however, blue color of methylene blue did not change even after a lapse of time.

Comparative Example 2

Titanium oxide (AERO OXIDE P90, available from Evonic Industries) was used as it was. This was treated as titanium oxide X2.

The titanium oxide X2 was subjected to methylene blue adsorption test in the same manner as in Example 1.

Differently from Example 1 and Comparative Example 1, the sedimented solid took on white color derived originally from titanium oxide, while the liquid took on blue color substantially the same as the color of the used methylene blue solution.

Test 2

Example 2

Preparation of Halloysite Powder 2

Halloysite powder 2 (corresponding to the "halloysite powder according to aspects of the invention" described above) was produced as described below.

Raw Material Halloysite

The same raw material halloysite as that of Example 1 was used.

Preparation of Slurry

Except that the anionic polymeric surfactant was changed to "POIZ 532A" available from Kao Corporation, a slurry was prepared from the raw material halloysite in the same manner as in Example 1.

Centrifugation

The same centrifugation operation as that in Example 1 was performed, and a dispersed phase (slurry) was recovered.

Addition of Titanium Oxide

To a solid component 90 parts by mass of the dispersed phase (slurry) thus recovered, 10 parts by mass of ultraviolet-light-responsive titanium oxide (ST-21, available from ISHIHARA SANGYO KAISHA, LTD.) with the primary particle size of 20 nm was added. A high-speed mixer (Ultra Homomixer UHM-20, available from NISSEI Corporation) was used to perform treatment at 10,000 rpm for 10 minutes, whereby titanium oxide was dispersed in the slurry. In addition, water was added to the resultant, and the same high-speed mixer was used to perform similar treatment, whereby the viscosity was set to 8.5 cP. The viscosity was measured using a Brookfield B type viscometer LVDVE under the conditions of a spindle of S61, and 100 rpm.

Spray-Drying

The dispersed phase (slurry) to which titanium oxide was added was spray-dried in the same manner as in Example 1, whereby powder was obtained.

Firing

In an electric furnace with air flowing thereinto, the powder obtained by spray-drying was heated at a temperature increase rate of 4° C./min. and then retained at 650° C. for one hour to be thereby fired. The powder having been fired was treated as halloysite powder 2.

Evaluation of Halloysite Powder 2

The halloysite powder 2 was evaluated as follows.

$TiO_2$ Content $TiO_2$ content in the halloysite powder 2 was measured. The result is shown below. The measurement conditions are as described above.

$TiO_2$ content: 10.5 mass %

XRD

The halloysite powder 2 was subjected to XRD measurement. The measurement conditions are as described above.

Figure 6:
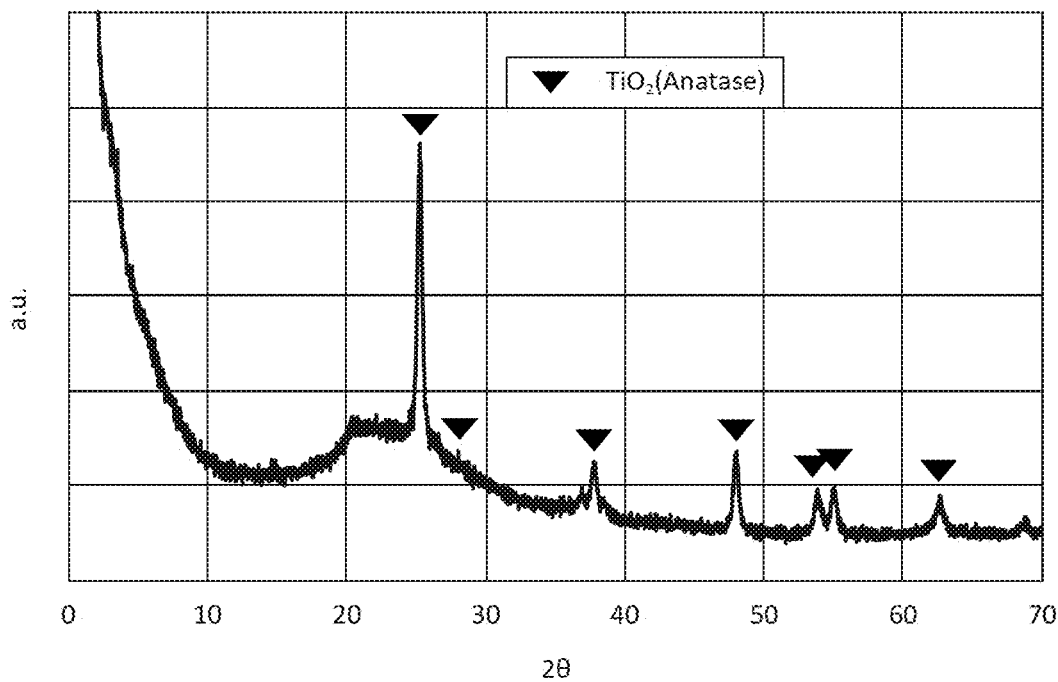
FIG. 6 is the XRD pattern of the halloysite powder 2.

FIG. 6 is the XRD pattern of the halloysite powder 2. As shown in FIG. 6, a broad peak of metahalloysite having low crystallinity and peaks of anatase-type titanium oxide ($TiO_2$) are seen in the XRD pattern of the halloysite powder 2.

SEM

Figure 4:
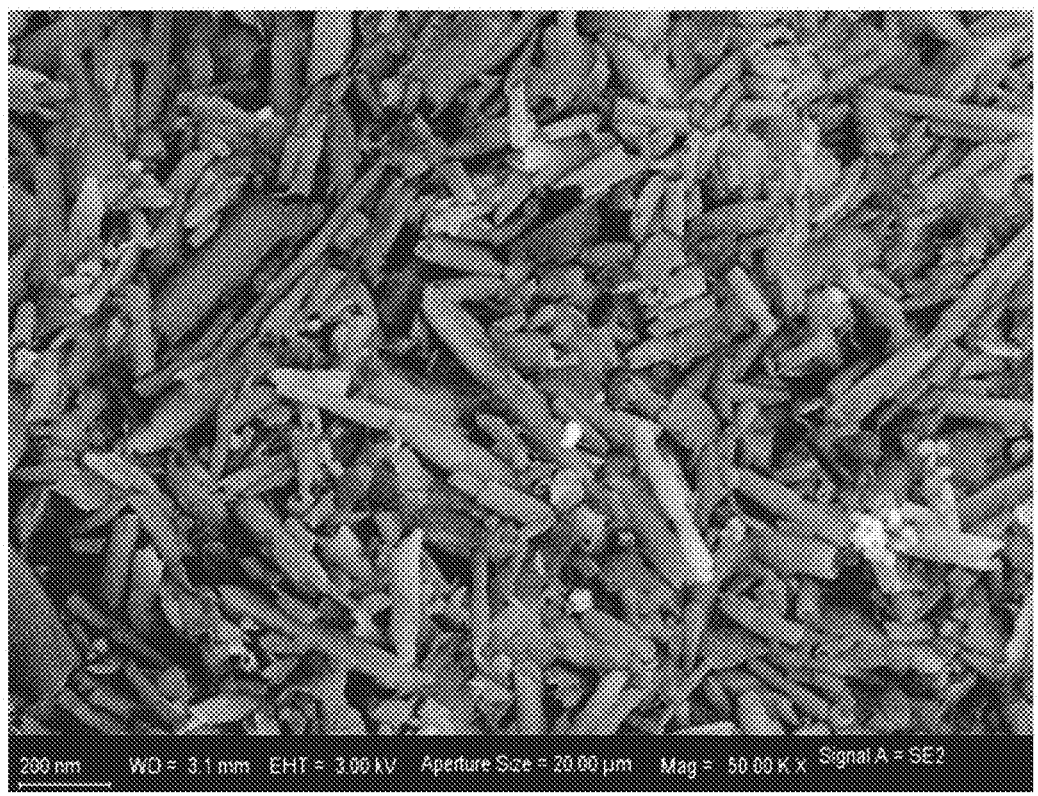
FIG. 4 is an SEM image showing a granule in halloysite powder 2.

An SEM image of the halloysite powder 2 was taken. FIG. 4 is an SEM image showing a granule of the halloysite powder 2.

As with the SEM image (Example 1) in FIG. 1, from the SEM image in FIG. 4, it was confirmed that the halloysite powder 2 included a granule in which metahalloysite including metahalloysite nanotubes was aggregated, and that pores (first pores) derived from tube holes of metahalloysite nanotubes were present on the granule surface. It was also confirmed that pores (second pores) with a larger size than that of the tube holes of metahalloysite nanotubes were present in a cross-section (not shown) of the granule.

It was also confirmed in the SEM image in FIG. 4 that each particle or an aggregate of particles of titanium oxide was attached to the granule surface or enters a gap between halloysite nanotubes constituting the granule.

Pore Distribution Measurement

The nitrogen adsorption-desorption isotherm of the halloysite powder 2 was obtained. The measurement conditions are as described above.

Figure 5:
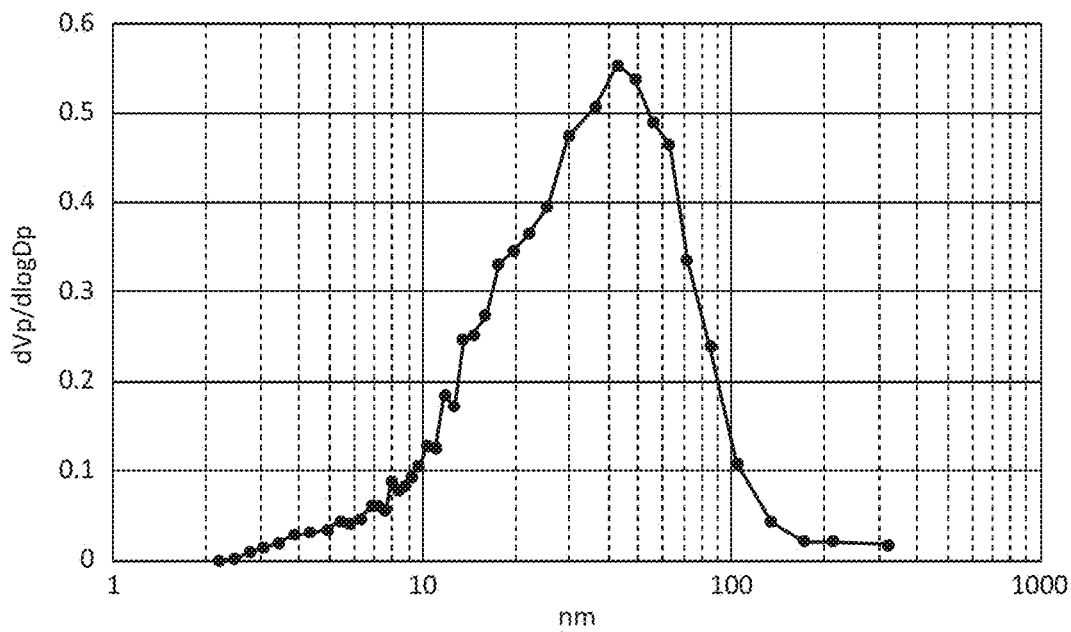
FIG. 5 is a graph showing the differential pore distribution of the halloysite powder 2.

FIG. 5 is a graph showing the differential pore distribution of the halloysite powder 2 determined from the nitrogen adsorption isotherm by the BJH method. The horizontal axis represents pore size [nm], and the vertical axis represents differential pore volume (dVp/dlogDp) [$cm^3$/g]. As with the graph (Example 1) in FIG. 1, in the graph in FIG. 5, two or more pore size peaks were observed in the range of 10 nm or more (10 to 100 nm).

Along with the pore distribution measurement, the BJH total pore volume, the BET specific surface area, and the average pore size were determined for the halloysite powder 2. The results are shown below.

BJH total pore volume: 0.41 $cm^3$/g
BET specific surface area: 67.32 $cm^2$/g
Average pore size: 24.3 nm Methylene Blue Adsorption Test The methylene blue solution having a mass/volume percent concentration of 0.02% used in Example 1 was replaced with a methylene blue solution having a mass/volume percent concentration of 0.0028% (mass of methylene blue in 100 mL: 0.0028 g). Except this change, the halloysite powder 2 was subjected to the same methylene blue adsorption test as that in Example 1.

The result thereof was similar to that of Example 1, and the sedimented solid took on blue color, while the liquid was colorless and transparent.

The methylene blue concentration of the liquid was measured, and the methylene blue adsorption amount was calculated. As a result, it was found that 2.8 mg of methylene blue was adsorbed onto 1 g of the halloysite powder 2.

Photocatalytic Test A (Ultraviolet Light)

A solid was obtained by recovering and drying sediment onto which methylene blue was adsorbed, fixed on a double faced tape, and subjected to photocatalytic test A using a UV lamp in the same manner as in Example 1.

As time passed, blue color of methylene blue disappeared, resulting in almost complete disappearance of the color in 217 hours.

Therefore, good photocatalytic activity of the halloysite powder 2 was confirmed.

Photocatalytic Test B (Visible Light)

The solid fixed on a double faced tape was irradiated with LED light free of ultraviolet light for the test, and decomposition of methylene blue was observed.

More specifically, the solid fixed on the double faced tape was placed to be located 30 cm away from an LED lamp (LED desk lamp DS-LS24DSM/K-W, available from OHM ELECTRIC INC.) as a light source. A change in blue color was observed in 217 hours, and it was confirmed that decomposition of methylene blue was proceeding.

In Example 2, although ultraviolet-light-responsive titanium oxide (ST-21, available from ISHIHARA SANGYO KAISHA, LTD.) was used, not only photocatalytic activity caused by ultraviolet light (see the result of photocatalytic test A), photocatalytic activity caused by visible light was also significantly observed (see the result of photocatalytic test B). This is probably an effect achieved by incorporating ultraviolet-light-responsive titanium oxide into halloysite to form a composite.

Comparative Example 3

Except that titanium oxide was not added to the dispersed phase (slurry), powder was obtained in the same manner as in Example 2 (halloysite powder 2). This powder was treated as halloysite powder X3.

The halloysite powder X3 was subjected to methylene blue adsorption test in the same manner as in Example 2. The result thereof was similar to that of Example 2, and the sedimented solid took on blue color, while the liquid was colorless and transparent. The methylene blue concentration on the liquid side was measured, and the methylene blue adsorption amount was calculated. As a result, it was found that 2.8 mg of methylene blue was adsorbed onto 1 g of the halloysite powder X3, similarly to the halloysite powder X2.

Subsequently, as with Example 2, the powder was subjected to photocatalytic test A (ultraviolet light) and photocatalytic test B (visible light). Differently from Example 2, no change in blue color of methylene blue was seen even after time passed in the both tests.

Comparative Example 4

Titanium oxide (ST-21, available from ISHIHARA SANGYO KAISHA, LTD.) used in Example 2 was used as it was. This was treated as titanium oxide X4.

The titanium oxide X4 was subjected to methylene adsorption test in the same manner as in Example 2.

Differently from Example 2 and Comparative Example 3, the sedimented solid took on white color originally derived from the titanium oxide, while the liquid took on blue color substantially the same as the color of the used methylene blue solution. Even when the methylene blue concentration of the liquid was measured, methylene blue adsorption onto the titanium oxide X4 was not confirmed.

Comparative Example 5

The titanium oxide X4 was fired at 650° C. for one hour in the same manner as in Example 2. The resultant was treated as titanium oxide X5.

The titanium oxide X5 was subjected to methylene blue adsorption test in the same manner as in Example 2.

Differently from Example 2 and Comparative Example 3, the sedimented solid took on white color originally derived from the titanium oxide, while the liquid took on blue color substantially the same as the color of the used methylene blue solution. The methylene blue concentration of the liquid was measured, but methylene blue adsorption onto the titanium oxide X5 was not confirmed.

Test 3

The titanium oxide was replaced with another kind of titanium oxide different from "ST-21," and the same test as that in Example 2 was conducted.

Specifically, using each of "AERO OXIDE P25" (available from Evonic Industries), "ST-01" (available from ISHIHARA SANGYO KAISHA, LTD.) and "MPT-623" (available from ISHIHARA SANGYO KAISHA, LTD.) in addition to "AERO OXIDE P90" used in Example 1, halloysite powder was prepared and subjected to the tests in the same manner as in Example 2.

In all of methylene blue adsorption test, photocatalytic test A (ultraviolet light), and photocatalytic test B (visible light), similar results to those of Example 2 were obtained.

The invention claimed is:

1. Halloysite powder that is powder including a granule in which halloysite including halloysite nanotubes and titanium oxide are aggregated, wherein a differential pore distribution determined from a nitrogen adsorption isotherm by BJH method exhibits two or more pore size peaks in a range of 10 nm or more, and wherein a titanium oxide content in the halloysite powder is not less than 2.00 mass % and not more than 15.00 mass %.

2. The halloysite powder according to claim 1, wherein the granule includes a first pore derived from a tube hole of each of the halloysite nanotubes, and a second pore different from the first pore.

* * * * *